United States Patent
Raj et al.

(10) Patent No.: US 12,388,747 B2
(45) Date of Patent: Aug. 12, 2025

(54) PROGRAMMABLE MULTICAST ROUTES ON A VIRTUAL GATEWAY SWITCH

(71) Applicant: Hewlett Packard Enterprise Development LP, Spring, TX (US)

(72) Inventors: Anil Raj, Bengaluru (IN); Tathagata Nandy, Bengaluru (IN); Tamil Esai Somu, Chennai (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 6 days.

(21) Appl. No.: 18/457,125

(22) Filed: Aug. 28, 2023

(65) Prior Publication Data

US 2025/0080456 A1 Mar. 6, 2025

(51) Int. Cl.
*H04L 45/586* (2022.01)
*H04L 12/18* (2006.01)
*H04L 45/02* (2022.01)
*H04L 45/24* (2022.01)

(52) U.S. Cl.
CPC .......... *H04L 45/586* (2013.01); *H04L 12/185* (2013.01); *H04L 45/02* (2013.01); *H04L 45/245* (2013.01)

(58) Field of Classification Search
CPC .............................. H04L 45/245; H04L 45/30
See application file for complete search history.

(56) References Cited

U.S. PATENT DOCUMENTS

2014/0369186 A1* 12/2014 Ernstrom ................ H04L 49/55
370/228
2016/0255043 A1* 9/2016 Mahadevan ........ H04L 61/5046
709/245
2024/0039834 A1* 2/2024 Megathlin ............ H04L 45/745

OTHER PUBLICATIONS

D. Vodnala, S. Aluvala and S. P. Kumar, "A Backbone based multicast routing protocol for route recovery in MANETs," 2015 2nd International Conference on Electronics and Communication Systems (ICECS), Coimbatore, India, 2015, pp. 237-241 (Year: 2015).*
Donoso, Y., Fabregat, R., & Marzo, J. L. (2004). Multi-objective optimization scheme for dynamic multicast groups (Year: 2004).*
Ren-Hung Hwang, "Adaptive multicast routing in single rate loss networks," Proceedings of Infocom'95, Boston, MA, USA, 1995, pp. 571-578 vol. 2 (Year: 1995).*

* cited by examiner

*Primary Examiner* — Messeret F Gebre
(74) *Attorney, Agent, or Firm* — Yao Legal Services, Inc.

(57) ABSTRACT

A first switch in a network is provided. During operation, the first switch can receive traffic associated with a virtual network address allocated to the first switch and a second switch. The first and second switches can provide high availability to each other. If a layer-3 static multicast route is received at the first switch for a multicast group, the first switch can configure the static multicast route in the control plane. The first switch can determine that a set of conversion conditions are satisfied for the static multicast route. The set of conversion conditions can be applicable to a respective switch associated with the virtual network address. If the set of conversion conditions is satisfied, the first switch can generate a set of layer-2 entries for the multicast group from the static multicast route and program the forwarding hardware to include the set of layer-2 entries.

20 Claims, 8 Drawing Sheets

PROGRAMMABLE MULTICAST ROUTES ON A VIRTUAL GATEWAY SWITCH

BACKGROUND

A switch in a network may support different protocols and services. For example, the switch can support an overlay network formed based on tunneling and virtual private networks (VPNs). The switch can then facilitate overlay routing for a VPN over the tunnels.

BRIEF DESCRIPTION OF THE FIGURES

In the figures, like reference numerals refer to the same figure elements.

DETAILED DESCRIPTION

In various Internet applications, multicast is frequently used to distribute content such as video from a source to multiple hosts. Efficient distribution of multicast traffic can improve the performance of a network. A network-layer multicast protocol, such as protocol-independent multicast (PIM), can be used for distributing content in a heterogeneous network. In some scenarios, a host can send a client join request (e.g., an Internet Group Management Protocol (IGMP) join request, or a Multicast Listener Discovery (MLD) join request) to an upstream switch. The switch can be in an overlay network formed based on overlay routing for a VPN over a set of tunnels. For example, an Ethernet VPN (EVPN) can be deployed as an overlay over a set of virtual extensible local area networks (VXLANs). To deploy a VPN over the tunnels, a respective tunnel endpoint may map a respective client virtual local area network (VLAN) to a corresponding tunnel network identifier (TNI), which can identify a virtual network for a tunnel.

The TNI may appear in a tunnel header that encapsulates a packet and is used for forwarding the encapsulated packet via a tunnel. For example, if the tunnel is formed based on VXLAN, the TNI can be a virtual network identifier (VNI) of a VXLAN header, and a tunnel endpoint can be a VXLAN tunnel endpoint (VTEP). A TNI can also be mapped to the virtual routing and forwarding (VRF) associated with the tunnels if layer-3 routing and forwarding are needed. Since a VPN can be distributed across the tunnel fabric, a VPN over the tunnel fabric can also be referred to as a distributed tunnel fabric. Since the fabric is an overlay network, a respective switch in the fabric can be a tunnel endpoint of one or more tunnels. Furthermore, a gateway switch of the fabric can be a VGS shared among a plurality of participating switches.

The aspects described herein address the problem of efficiently installing a programmable multicast route (PMR) in the participating switches of a VGS by (i) generating bridged entries based on the PMR for the locally configured VLANs of a candidate participating switch; and (ii) installing the bridged entries in the forwarding hardware while maintaining the PMR in a routing data structure. A PMR can be a layer-3 multicast route that can be statically programmed and removed by a user (e.g., an administrator). Here, the candidate participating switch can be a secondary switch of the VGS in a symmetric topology. Because an egress-blocking rule can prevent the bridged entries from forwarding multicast traffic, the programmable multicast route can be programmed in the VGS without causing duplications.

An overlay network, such as a distributed tunnel fabric, can be coupled to other networks via a gateway switch. The gateway switch can be a VGS in the overlay network. Typically, at least two switches can operate as a single switch in conjunction with each other to facilitate the VGS. Switches participating in the VGS can be referred to as participating switches. A respective participating switch can consider the other participating switches as peer participating switches (or peer switches). A respective pair of participating switches can be coupled to each other via an inter-switch link (ISL). The VGS can be associated with one or more virtual network addresses (e.g., a virtual Internet Protocol (IP) address and/or a virtual media access control (MAC) address). A respective tunnel formed at the VGS can use the virtual network address to form the tunnel endpoint. As a result, other tunnel endpoints (i.e., other switches) of the overlay network can consider the VGS as the other tunnel endpoint for a tunnel instead of any of the participating switches.

To forward traffic toward the VGS, a respective switch in the overlay network can perform a load balancing operation (e.g., based on hashing on a respective packet) and select one of the participating switches as the destination (i.e., as the other tunnel endpoint). The switch can use a routing protocol, such as Border Gateway Protocol (BGP), to determine the routes used for the load balancing. The switch can then forward the packet via a tunnel between the tunnel endpoints. Hence, an endpoint may forward a multicast control packet to one of the participating switches, which in turn, can share the control packet with a peer participating switch via the ISL. Similarly, if the switch receives a multicast data packet via a tunnel, the switch can share the packet with the peer participating switch via the ISL.

For each multicast group, one of the participating switches can be selected as a primary switch, while the rest of the participating switches can be secondary switches. The primary switch can be responsible for forwarding multicast traffic of the multicast group to the downstream requesting hosts on behalf of the VGS. Typically, the primary switch can share the multicast traffic via the ISL on a respective VLAN configured on both primary and secondary switches. Because the multicast traffic is also shared via the ISL, an egress-blocking rule is configured at a respective participating switch of the VGS to prevent duplication of traffic. The rule prevents downstream forwarding of any multicast data packet received via the ISL. Typically, the egress-blocking rule is applied to bridged entries. If the primary switch cannot forward the multicast traffic (e.g., due to a link failure), the egress-blocking rule is disabled, and the secondary switch can start forwarding the multicast traffic.

With existing technologies, if a high-volume and high-subscription multicast data flow (e.g., video streaming of a football game, a popular program, or a speech) is anticipated at a predetermined time, a PMR (e.g., a layer-3 route) can be configured for the corresponding multicast group at the switches in the network. The PMR can be a static route that can be programmed and removed based on user configuration, which can be provided via a management platform. When the operational application (e.g., the multicast daemon) in the switch's software receives the configuration, the switch can store the PMR in an entry in a routing data structure that stores multicast routes. Therefore, the routing data structure can be maintained in the control plane of the switch. Depending on the location of the requesting hosts of the multicast flow, the route can indicate an egress virtual local area network (VLAN) or an egress interface. The application can also program the forwarding hardware of the switch with the entry.

For a VGS, an entry for the PMR can be programmed in both primary and secondary switches. When the primary switch receives the multicast data flow, the primary switch can forward the flow to the downstream switches based on the programmed entry. The primary switch can also share the flow via the ISL to the secondary switch for a respective VLAN configured at the VGS. The egress-blocking rule can prevent the secondary switch from forwarding traffic received via the ISL. However, because the PMR is statically programmed, the entry can be a layer-3 routed entry in the forwarding hardware. As a result, the egress-blocking rule may not prevent traffic forwarding via the egress VLAN. Consequently, the downstream devices may receive duplicate traffic from both primary and secondary switches.

To address this problem, when a participating switch receives the configuration for a PMR of a multicast group, the switch can generate a layer-3 routed entry representing the PMR in a routing data structure in the control plane of the switch. The switch can also check whether a set of conversion conditions is met. The conversion conditions are associated with a respective switch in the VGS (i.e., associated with the virtual network addresses). The conversion conditions can indicate whether the switch is the secondary switch for the multicast group and whether the VGS is symmetric. The VGS can be symmetric if the same virtual and physical network topologies are deployed with the participating switches. For example, if the same devices are coupled to, and the same set of VLANs are configured on each of the participating switches, the VGS can be symmetric. If the conversion conditions are met, the switch can program a set of layer-2 bridged entries in the forwarding hardware instead of the routed entry.

To do so, the switch can generate the set of bridged entries based on the PMR. Each entry can correspond to one of the VLANs configured at the VGS. In this way, the switch can generate a bridged entry for a respective VLAN configured at the switch. Upon generating the set of bridged entries, the switch can program the bridged entries in the forwarding hardware instead of the routed entry. This allows the forwarding hardware to apply the egress-blocking rule to the bridged entries. As a result, even if a user (e.g., an administrator) configures a PMR for the VGS, the egress-blocking rule at the secondary switch can prevent the forwarding of the data shared via the ISL of the VGS, thereby preventing duplication of the multicast traffic associated with the PMR at the downstream devices.

Furthermore, the routed entry can remain available in the routing data structure in the control plane of the switch. If the primary switch or the ISL becomes unavailable, the secondary switch can remove the bridged entries from the forwarding hardware. The switch can obtain the routed entry from the routing data structure and program the routed entry in the forwarding hardware. On the other hand, if a link from the primary switch to a downstream device becomes unavailable, the secondary switch can disable the egress-blocking rule. This allows the distribution of the multicast traffic associated with the PMR, which can be received via the ISL, across all VLANs programmed at the VGS. In this way, the participating switches in the VGS can facilitate high availability while supporting static PMRs without causing traffic duplication.

In this disclosure, the term "switch" is used in a generic sense, and it can refer to any standalone or fabric switch operating in any network layer. "Switch" should not be interpreted as limiting examples of the present invention to layer-2 networks. Any device that can forward traffic to an external device or another switch can be referred to as a "switch." Any physical or virtual device (e.g., a virtual machine or switch operating on a computing device) that can forward traffic to an end device can be referred to as a "switch." Examples of a "switch" include, but are not limited to, a layer-2 switch, a layer-3 router, a routing switch, a component of a Gen-Z network, or a fabric switch comprising a plurality of similar or heterogeneous smaller physical and/or virtual switches.

The term "packet" refers to a group of bits that can be transported together across a network. "Packet" should not be interpreted as limiting examples of the present invention to a particular layer of a network protocol stack. "Packet" can be replaced by other terminologies referring to a group of bits, such as "message," "frame," "cell," "datagram," or "transaction." Furthermore, the term "port" can refer to the port that can receive or transmit data. "Port" can also refer to the hardware, software, and/or firmware logic that can facilitate the operations of that port.

Figure 1:
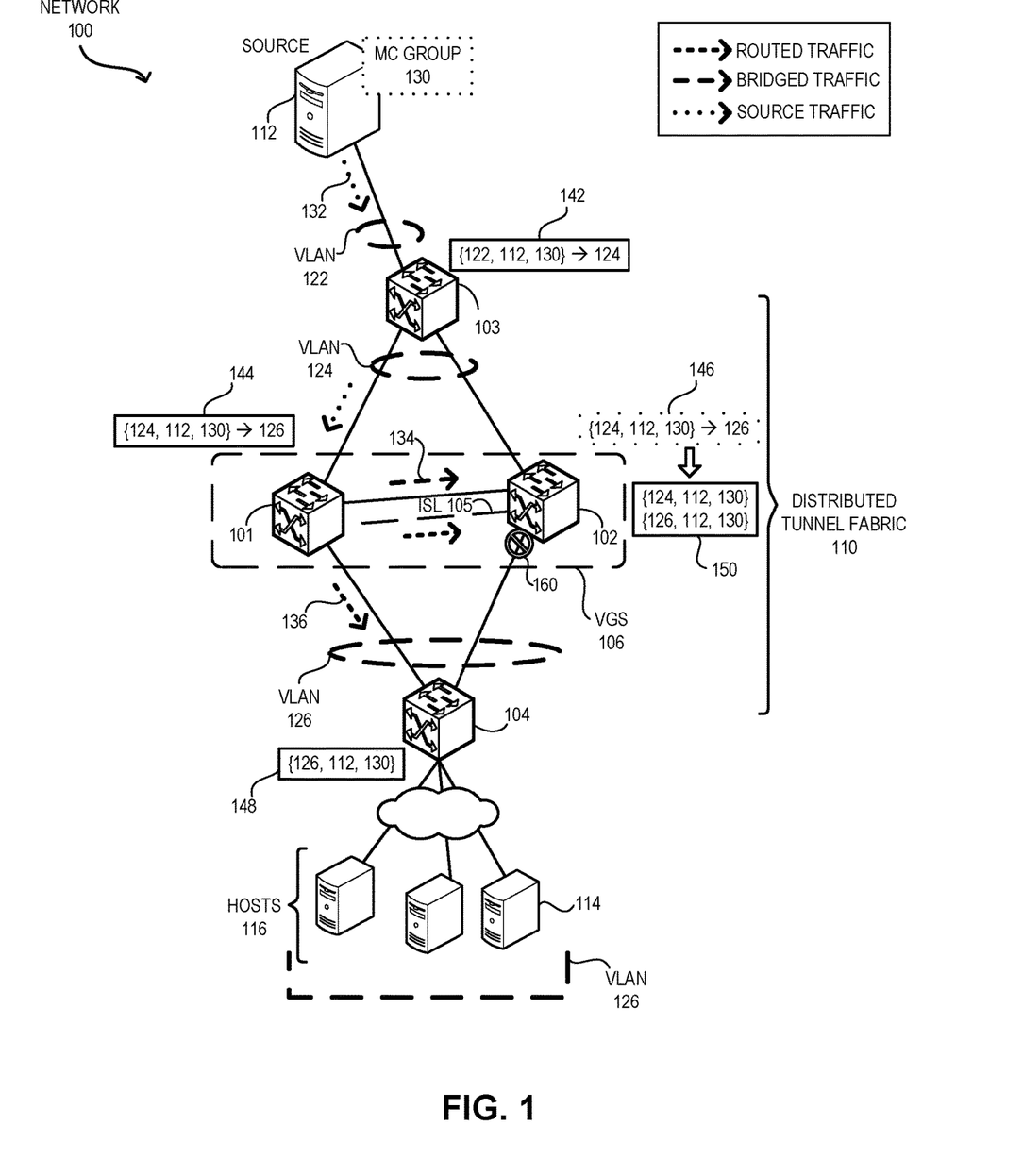
FIG. 1 illustrates an example of a virtual gateway switch (VGS) supporting efficient installation of programmable multicast routes, in accordance with an aspect of the present application.

FIG. 1 illustrates an example of a VGS supporting efficient installation of programmable multicast routes, in accordance with an aspect of the present application. A network 100 can include a number of switches and devices, and may include heterogeneous network components, such as layer-2 and layer-3 hops, and tunnels. In some examples, network 100 can be an Ethernet network, InfiniBand network, or other network, and may use a corresponding communication protocol, such as Internet Protocol (IP), FibreChannel over Ethernet (FCoE), or other protocol. Network 100 can include switches 101, 102, 103, and 104. A respective switch in network 100 can be associated with a MAC address and an IP address. An end device 112 can be coupled to switch 103. Similarly, a number of end devices, such as end device 114, can be reachable through switch 104 via one or more hops (denoted with a "cloud"). In other words, these end devices can be locally or remotely coupled to switch 104.

Switches 101, 102, 103, and 104 can be in a distributed tunnel fabric 110, where the switches can be coupled to each other via tunnels. In fabric 110, tunnel encapsulation is initiated and terminated within fabric 110. Switches in fabric 110 may form a mesh of tunnels. Examples of a tunnel can include, but are not limited to, VXLAN, Generic Routing Encapsulation (GRE), Network Virtualization using GRE (NVGRE), Generic Networking Virtualization Encapsulation (Geneve), Internet Protocol Security (IPsec), and Multiprotocol Label Switching (MPLS). The tunnels in fabric 110 can be formed over an underlying network (or an underlay network). The underlying network can be a physical network, and a respective link of the underlying network can be a physical link. A respective switch pair in the underlying network can be a BGP peer. A VPN, such as an Ethernet VPN (EVPN), can be deployed over fabric 110.

In fabric 110, switches 101 and 102 can operate as a single switch in conjunction with each other to facilitate a VGS 106. VGS 106 can operate as the gateway switch of fabric 110 and facilitate external communication for fabric 110. For example, VGS 106 can couple fabric 110 to an external network, such as an enterprise network or the Internet. VGS 106 can be associated with one or more virtual network addresses (e.g., a virtual IP address and/or a virtual MAC address). Consequently, both switches 101 and 102 can be associated with the virtual network addresses. The virtual network addresses allow switches 101 and 102 to facilitate high availability to each other. For example, if one of these switches becomes unavailable due to a failure or power cycle, the other switch can remain associated with the virtual network addresses and continue to receive and forward packets based on the virtual network addresses.

Moreover, a respective tunnel formed at VGS 106 can use the virtual network addresses to form the tunnel endpoint. As a result, either switch 101 or 102 can receive packets forwarded based on the virtual IP address. To efficiently manage data forwarding, switches 101 and 102 can maintain an ISL 105 between them for sharing control and/or data packets. ISL 105 can be a layer-2 or layer-3 connection that allows data forwarding between switches 101 and 102. ISL 105 can also be based on a tunnel between switches 101 and 102 (e.g., a VXLAN tunnel). It should be noted that VGS 106 may be configured on switches 101 and 102 without forming fabric 110.

Switch 103 can be coupled to VGS 106 via a multi-chassis link aggregation group (MC-LAG). For example, switch 103 can be coupled to switches 101 and 102 via respective links. These links can be grouped together to operate as a logical or virtual link, which is represented by the MC-LAG. Similarly, switch 104 can be coupled to VGS 106 via another MC-LAG. End device 112 can belong to VLAN 122. Hence, VLAN 122 can be configured on the port of switch 103 that couples end device 112. On the other hand, VLAN 124 can be configured for the MC-LAG coupling switch 103 to VGS 106. As a result, the ports participating in the MC-LAG can be configured with VLAN 124. Furthermore, VLAN 126 can be configured for the MC-LAG coupling VGS 106 to switch 104. End devices coupling switch 104, such as end device 114, can also belong to VLAN 126.

Often a high-volume and high-subscription multicast data flow (e.g., video streaming of a football game, a popular program, or a speech) can be anticipated at a predetermined time. Suppose that the flow is from a multicast group 130. In this example, end device 112 can be a source for multicast group 130. Hence, end device 112 can also be called source device 112. The end devices coupling switch 104 can be requesting hosts 116 for multicast group 130. Based on the presence of a number of requesting hosts coupling switch 104, the multicast data flow of multicast group 130 can be anticipated to flow from switch 103 toward switch 104 via VGS 106. With existing technologies, because the initiation and termination of the data flow of multicast group 130 can be known beforehand, a static PMR can be configured on VGS 106 and switches 103 and 104. The PMR can ensure that the switches in network 100 can readily start forwarding when the multicast data flow becomes available. Because the PMR can be a static route, the entries associated with the PMR can be added and removed by a user. Hence, the entries representing the PMR may not time out.

For switch 103, the PMR can indicate that multicast traffic belonging to multicast group 130 and received from source device 112 via VLAN 122 should be forwarded to VLAN 124. A user can issue a command to switch 103 to configure the PMR. The command can be:

"ip multicast-static-route source_VLAN source_address group_address dest_VLAN"

The command at switch 103 can include the identifier or tag of VLAN 122, an IP address of end device 122, a multicast IP address of multicast group 130, and the identifier of VLAN 124 as source_VLAN, source_address, group_address, and dest_VLAN, respectively. Switch 103 can receive the command and generate a corresponding entry 142. Switch 103 can store entry 142 in a routing data structure in the control plane. Entry 142 can also be programmed in the forwarding hardware of switch 103.

Similarly, a PMR for VGS 106 can indicate that multicast traffic belonging to multicast group 130 and received from source device 112 via VLAN 124 should be forwarded to VLAN 126. Suppose switches 101 and 102 are elected as primary and secondary switches for multicast group 130, respectively. The PMR can be stored in the routing data structures of both switches. Furthermore, a corresponding routed entry 144 can be programmed in the forwarding hardware of both switches 101 and 102. During operation, primary switch 101 can receive source traffic 132 via VLAN 124. Source traffic 132 can be the multicast traffic of multicast group 130 from source device 112. Switch 101 can receive source traffic 132 and apply routed entry 144 on source traffic 132 in the forwarding hardware. Accordingly, switch 101 can forward corresponding routed traffic 136 to switch 104 because VLAN 126 is configured on switch 104. Routed traffic can be the traffic (e.g., source traffic 132) forwarded based on a routed entry.

Because switch 102 is a peer participating switch of VGS 106 and VLAN 126 is configured on switch 102, switch 101 can forward routed traffic 136 to switch 102 via ISL 105. Furthermore, traffic received via a VLAN should be distributed in the VLAN. Therefore, the presence of the same VLANs on both switches 101 and 102 can cause switch 101 to forward bridged traffic 134 of multicast group 130 to switch 102 via ISL 105. Bridged traffic can be the traffic (e.g., source traffic 132) forwarded based on a bridged entry. Bridged traffic 134 can be forwarded via a respective VLAN configured on switches 101 and 102. Typically, egress-blocking rule 160 can prevent switch 102 from forwarding traffic received via ISL 105. However, because routed entry 144 is a statically configured layer-3 entry in the forwarding hardware, egress-blocking rule 160 may not be applicable to routed entry 144.

Consequently, switch 102 may forward routed traffic 136 to switch 104 as well and cause switch 104 to receive duplicate traffic for multicast group 130. If switch 104 is not configured with a duplication prevention mechanism (e.g., to drop one of the duplicate flows), the duplicate traffic for multicast group 130 can be forwarded to hosts 116 as well. To address this problem, each of switches 101 and 102 can determine whether it is a candidate switch based on a set of conversion conditions. The conversion conditions are associated with a respective switch in VGS 106. If a switch is a candidate switch, the switch can generate a set of bridged entries for the PMR and install the bridged entries in the forwarding hardware instead of routed entry 144.

When switch 101 receives the command for the PMR of multicast group 130, switch 101 can generate layer-3 routed entry 144 representing the PMR in a routing data structure in the control plane of switch 101. Similarly, upon receiving the command, switch 102 can generate layer-3 routed entry 146 representing the PMR in a routing data structure in the control plane of switch 101. Switches 101 and 102 can also check whether a set of conversion conditions is met. The conversion conditions can indicate whether the local switch is the secondary switch for multicast group 130 and whether VGS 106 is symmetric. For example, checking the conversion conditions at switch 101 can include determining whether switch 101 is the secondary switch for multicast group 130. On the other hand, checking the conversion conditions at switch 102 can include determining whether switch 102 is the secondary switch for multicast group 130. VGS 106 can be symmetric if the same devices are coupled to, and the same set of VLANs are configured on switches 101 and 102. Because switch 101 is the primary switch, the conversion conditions are not met at switch 101. Switch 101 can then program routed entry 144 in the forwarding hardware (denoted with a rectangle with solid lines).

On the other hand, because switch 102 is the secondary switch and VGS 106 is symmetric, the conversion conditions are met. Therefore, switch 102 can be a candidate participating switch. Accordingly, switch 102 can convert routed entry 146 to a set of bridged entries 150. Each entry in bridged entries 150 can correspond to one of the VLANs configured at VGS 106. In this example, VLANs 124 and 126 are configured at VGS 106. Therefore, bridged entries 150 can include respective bridged entries for VLANs 124 and 126. For example, the bridged entry for VLAN 124 can indicate that multicast traffic belonging to multicast group 130 and received from source device 112 via VLAN 124 should be distributed in VLAN 124. Because a bridged entry is a layer-2 entry, the ingress and egress VLANs can be the same (i.e., forwarding across VLANs is not supported). Switch 102 can then program bridged entry 150 in the forwarding hardware instead of routed entry 146.

Switch 102 can continue to maintain routed entry 146 in the routing data structure without programming it in the forwarding hardware (denoted with a rectangle with dotted lines). This allows the forwarding hardware of switch 102 to apply egress-blocking rule 160 to bridged entries 150. As a result, even if a user configures the PMR for VGS 106, egress-blocking rule 160 at switch 102 can prevent the forwarding of multicast traffic shared via ISL 105 and prevent duplication of the multicast traffic of multicast group 130 at switch 104. Switch 104 can then receive the multicast traffic of multicast group 130 from switch 101. Because switch 104 is anticipated to forward traffic to a number of hosts 116, a bridged entry 148 associated with VLAN 126 can be statically programmed at switch 104. Upon receiving the multicast traffic from switch 101, switch 104 can forward the traffic to hosts 116 based on a bridged entry 148.

Figure 2:
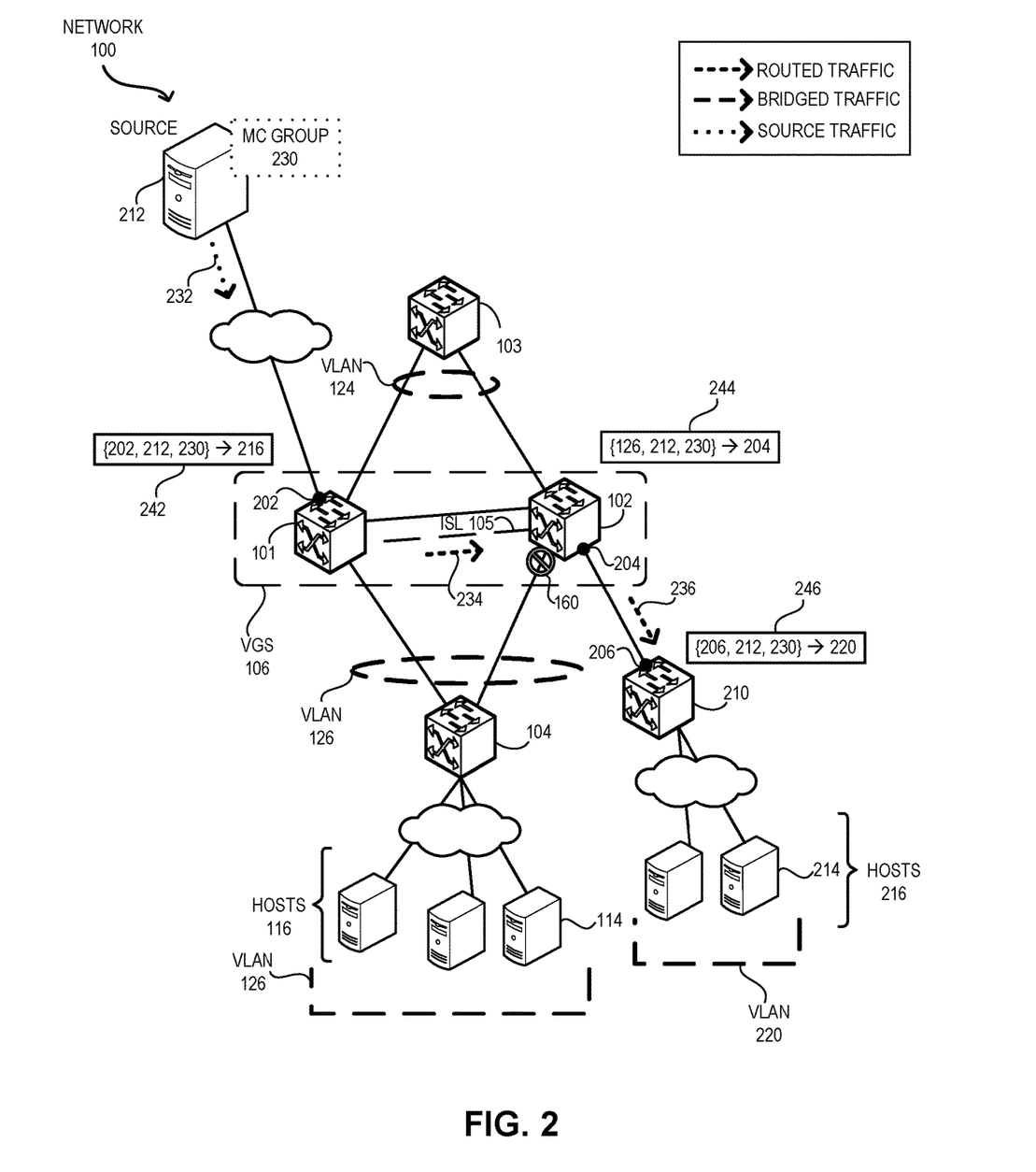
FIG. 2 illustrates an example of a VGS supporting efficient installation of programmable multicast routes in an asymmetric topology, in accordance with an aspect of the present application.

FIG. 2 illustrates an example of a VGS supporting efficient installation of programmable multicast routes in an asymmetric topology, in accordance with an aspect of the present application. Suppose that a high-volume and high-subscription multicast data flow from a multicast group 230 can be anticipated at a predetermined time from a source device 212. Source device 212 can be coupled to a port of switch 101 via one or more hops. A set of requesting hosts 216, such as end device 214, for multicast group 230 can be reachable via a switch 210 via one or more hosts. Requesting hosts 216 can be on VLAN 220. Switch 210 can be coupled to switch 102 via ports 204 and 206 of switches 102 and 210, respectively.

Based on the presence of a number of requesting hosts coupling switch 210, the multicast data flow of multicast group 230 can be anticipated to flow from switch 101 toward switch 210 via switch 102. To ensure the switches in network 100 can readily start forwarding when the multicast data flow becomes available, a user can configure a PMR for a respective switch in network 100. A user can issue a command to switch 101 to configure the PMR, which can indicate that multicast traffic belonging to multicast group 230 and received from source device 212 via port 202 should be forwarded to VLAN 126.

Switch 101 can receive the command and generate a corresponding entry 242. Switch 101 can store entry 242 in a routing data structure in the control plane. Since source device 212 is coupled to participating switch 101 and not to VGS 106, the upstream topology of VGS 106 can be asymmetric. Similarly, because requesting hosts 216 are reachable via switch 102 and not via an MC-LAG coupling VGS 106, the downstream topology of VGS 106 can be asymmetric. If either the upstream or downstream topology of VGS is asymmetric, the overall topology of VGS can be considered asymmetric.

As a result, the conversion conditions are not met for switches 101 and 102 regardless of their primary or secondary status for multicast group 230. Accordingly, entry 242 can also be programmed in the forwarding hardware of switch 101. During operation, primary switch 101 can receive source traffic 232 via port 202. Source traffic 232 can be the multicast traffic of multicast group 230 from source device 212. Switch 101 can receive source traffic 232 and apply routed entry 242 on source traffic 232 in the forwarding hardware. Because switch 102 is a peer participating switch of VGS 106 and VLAN 126 is configured on switch 102, switch 101 can forward routed traffic 234 to switch 102 via ISL 105 on VLAN 126. It should be noted that switch 101 can share the multicast traffic via ISL 105 on a respective VLAN configured on both switches 101 and 102.

To facilitate the forwarding of routed traffic 234 to switch 210, the user can issue a command to switch 102 to configure the PMR, which can indicate that multicast traffic belonging to multicast group 230 and received from source device 212 via VLAN 126 should be forwarded to port 204. Switch 102 can receive the command and generate a corresponding entry 244. Switch 102 can store entry 244 in a routing data structure in the control plane. Because the conversion conditions are not met at switch 102, entry 244 can also be programmed in the forwarding hardware of switch 102. Entry 244 allows switch 102 to forward routed traffic 236 via port 204. Traffic forwarded via port 204 can be received by switch via port 206. Here, entry 244 is defined for traffic received via port 204. Consequently, routed traffic 236 is not forwarded based on an ingress VLAN.

The user can also issue a command to switch 210 to configure the PMR, which can indicate that multicast traffic belonging to multicast group 230 and received from source device 212 via port 206 should be forwarded to VLAN 220. Switch 210 can receive the command and generate a corresponding entry 246. Switch 210 can store entry 246 in a routing data structure in the control plane. Entry 246 can also be programmed in the forwarding hardware of switch 210. Entry 246 allows switch 210 to distribute routed traffic 234 via VLAN 220 toward requesting hosts 216. In this way, even if the conversion conditions are not met due to the asymmetry of VGS 106, multicast traffic can be forwarded via VGS 106.

Figure 3A:
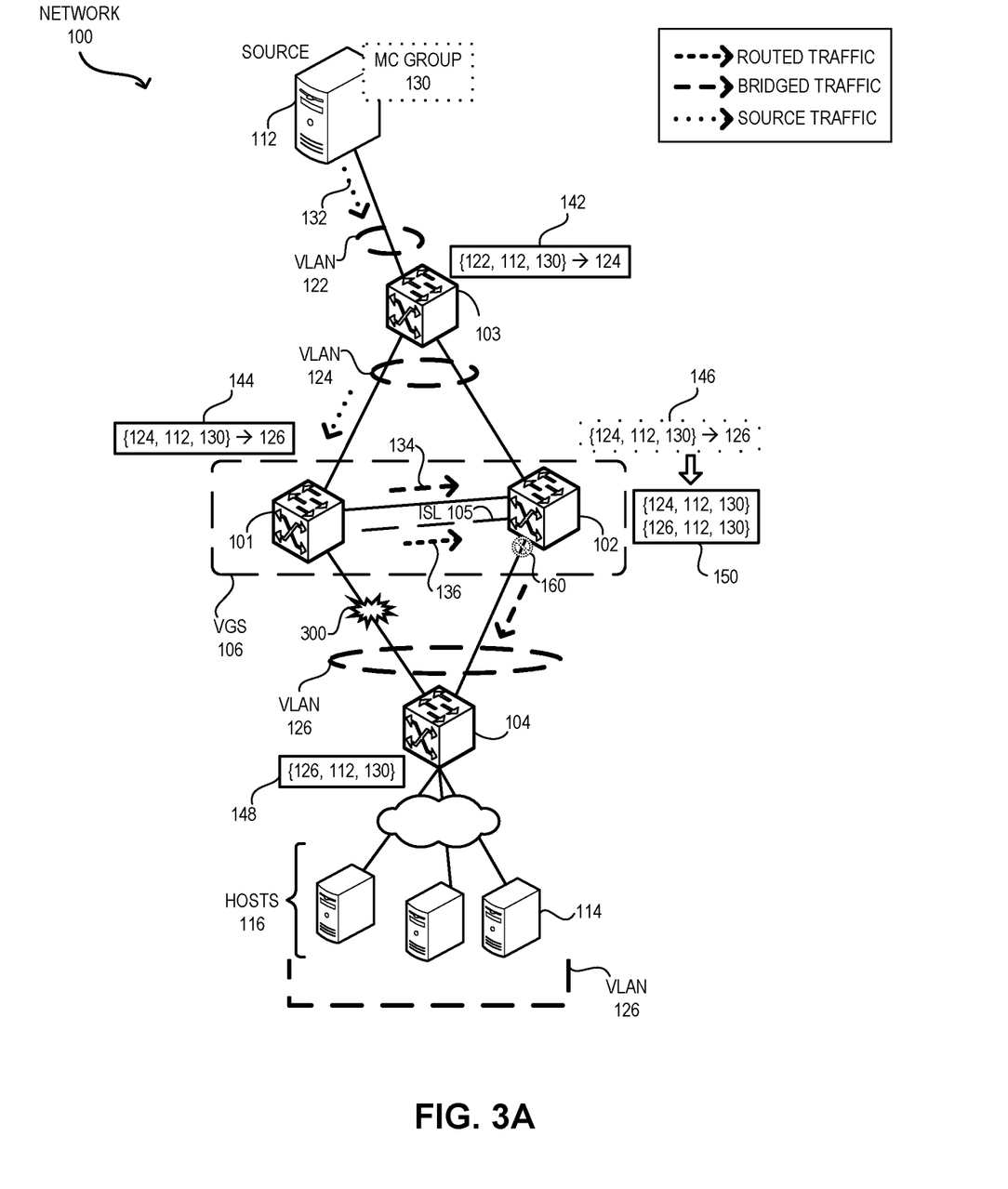
FIG. 3A illustrates an example of facilitating high availability to address a link failure using a programmable multicast route, in accordance with an aspect of the present application.

FIG. 3A illustrates an example of facilitating high availability to address a link failure using a programmable multicast route, in accordance with an aspect of the present application. Suppose that an event 300 causes the link between switches 101 and 104 to be unavailable. The link can be in an MC-LAG. As a result, switch 101 cannot forward traffic to switch 104 even though VGS 106 remains operational. Upon detecting event 300, switch 101 may notify switch 102 regarding event 300. Switch 102 can then disable egress-blocking rule 160 (denoted with dotted lines). Since egress-blocking rule 160 is no longer applied to bridged entries 150, switch 102 can start distributing bridged traffic 134, which can be received via ISL 105, in VLANs 124 and 126 based on bridged entries 150. Switch 104 can then start receiving bridged traffic 134. In this way, switch 102 can facilitate high availability without causing traffic duplication.

Figure 3B:
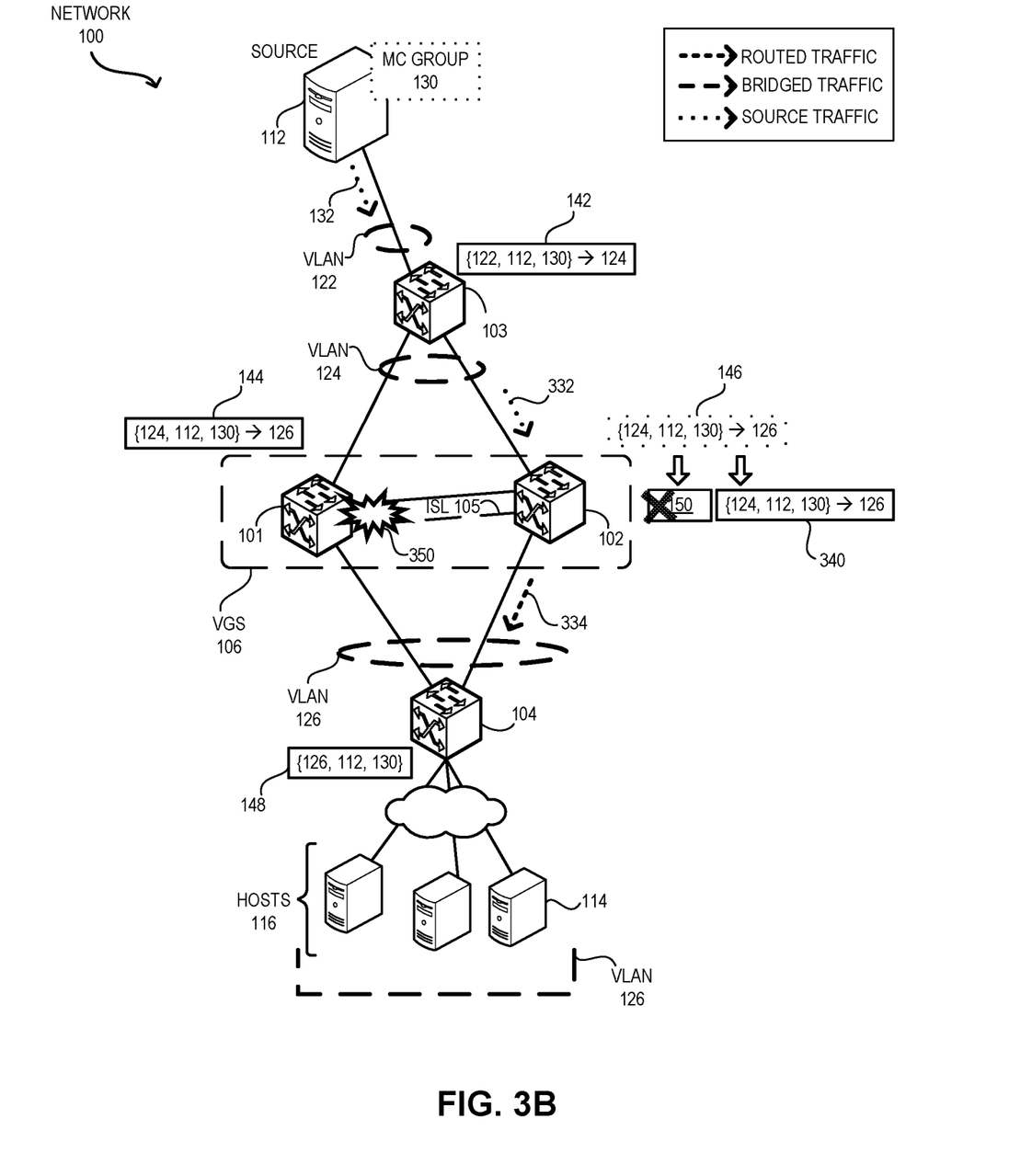
FIG. 3B illustrates an example of facilitating high availability to mitigate a failure associated with a VGS using a programmable multicast route, in accordance with an aspect of the present application.

FIG. 3B illustrates an example of facilitating high availability to mitigate a failure associated with a VGS using a programmable multicast route, in accordance with an aspect of the present application. Suppose that an event 350 causes switch 101 to be unavailable in VGS 106. Event 350 can include one or more of: a failure in ISL 105 and a node failure in switch 101. Switch 102 can detect the unavailability based on a keepalive mechanism for VGS 106. Switch 102 can then start operating as the primary switch for multicast group 130. To do so, switch 102 can remove bridged entries 150 from the forwarding hardware (denoted with a cross).

Because entry 146 can remain available in the routing data structure in the control plane of switch 102, switch 102 can retrieve entry 146. Switch 102 can then program an entry 340, which corresponds to entry 146, in the forwarding hardware of switch 102. The unavailability of switch 101 can disrupt the MC-LAG coupling switch 103. As a result, switch 103 can start forwarding source traffic 332 of multicast group 130 to switch 102 instead of switch 101. Based on entry 340, switch 102 can then forward routed traffic 334, which includes source traffic 332 routed based on entry 340, to switch 104. In this way, switch 102 can facilitate high availability to mitigate the impact of event 350.

Figure 4A:
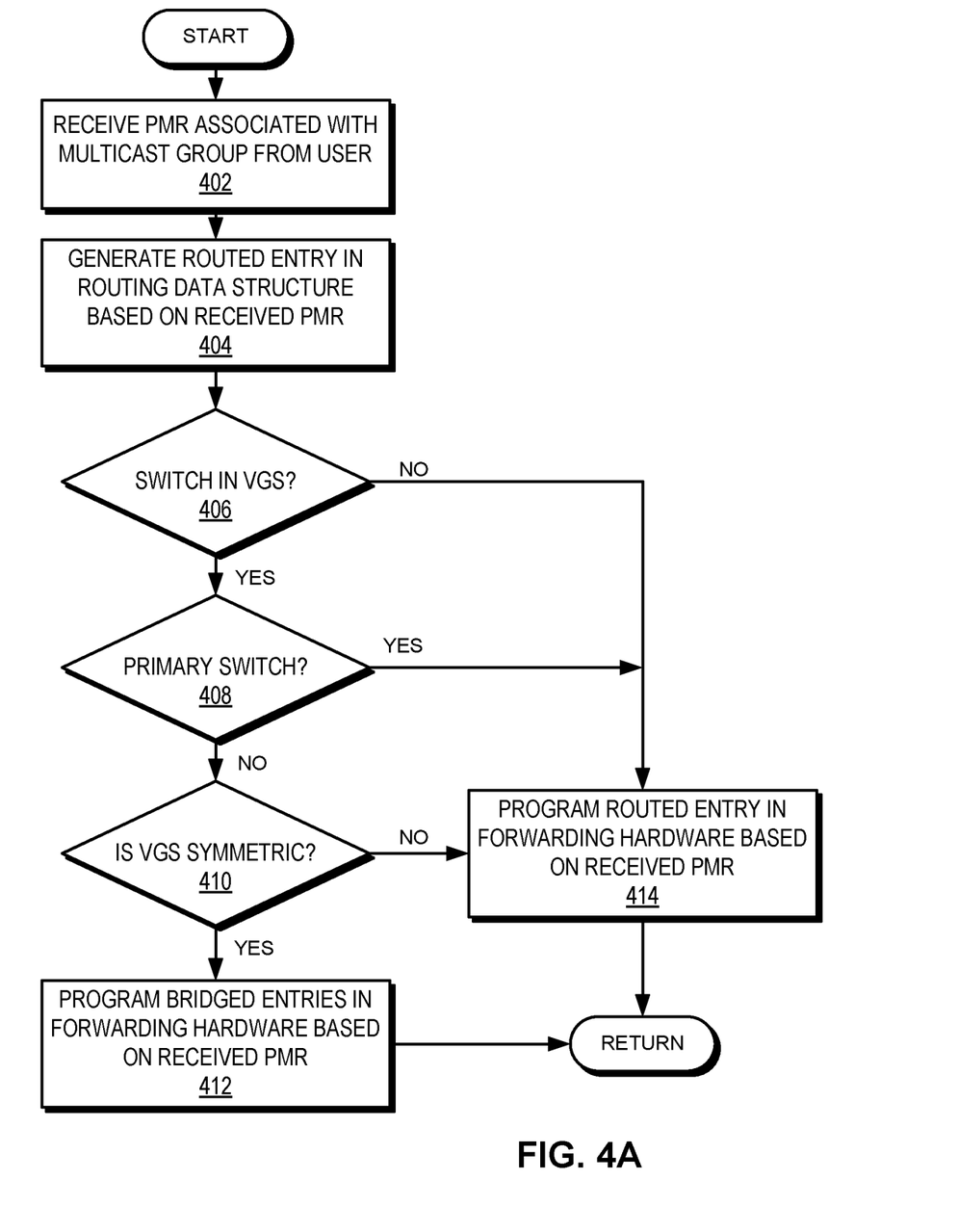
FIG. 4A presents a flowchart illustrating the process of a switch installing a programmable multicast route in forwarding hardware, in accordance with an aspect of the present application.

FIG. 4A presents a flowchart illustrating the process of a switch installing a programmable multicast route in forwarding hardware, in accordance with an aspect of the present application. During operation, the switch can receive a PMR associated with a multicast group from a user (operation 402) and generate a routed entry in the routing data structure based on the received PMR (operation 404). The switch can then determine whether the switch is in a VGS (operation 406). If the switch is in a VGS, the switch can determine whether the switch is the primary switch for the multicast group (operation 408).

If the switch is not the primary switch, the switch can determine whether the VGS is symmetric (operation 410). If the VGS is symmetric, the switch can program bridged entries in the forwarding hardware based on the received PMR (operation 412). On the other hand, If the switch is not in a VGS (operation 406), is the primary switch (operation 408), or the VGS is not symmetric, the switch can then program routed entries in the forwarding hardware based on the received PMR (operation 414).

Figure 4B:
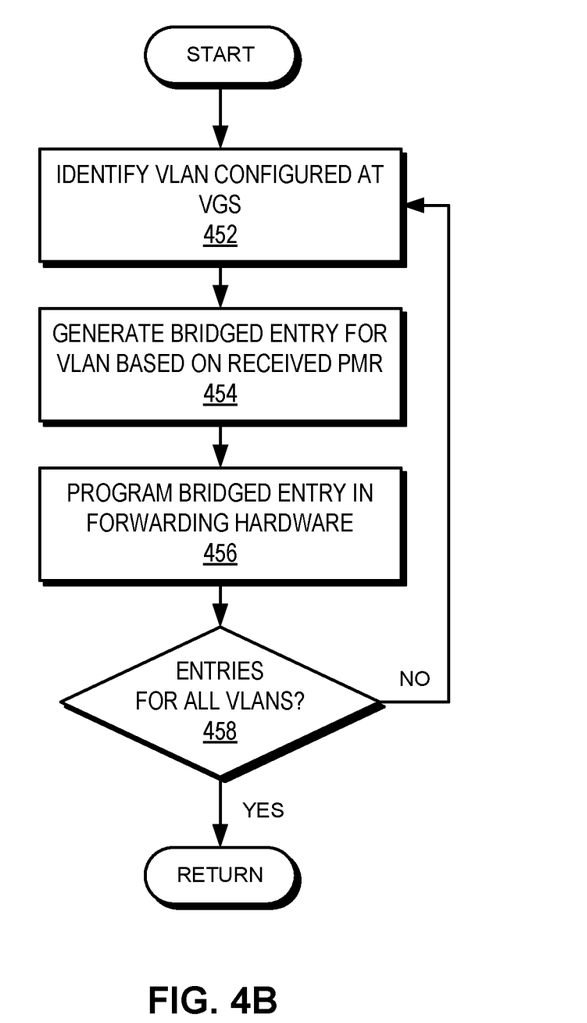
FIG. 4B presents a flowchart illustrating the process of a secondary switch in a VGS generating bridged entries based on a programmable multicast route, in accordance with an aspect of the present application.

FIG. 4B presents a flowchart illustrating the process of a secondary switch in a VGS generating bridged entries based on a programmable multicast route, in accordance with an aspect of the present application. During operation, the switch can identify a VLAN configured at the VGS (operation 452) and generate a bridged entry for the VLAN based on the received PMR (operation 454). The switch can then program the bridged entry in the forwarding hardware (operation 456). The switch can determine whether entries for all VLANs configured at the VGS have been generated (operation 458). If entries for all VLANs have not been generated, the switch can continue to identify another VLAN configured at the VGS (operation 452).

Figure 5:
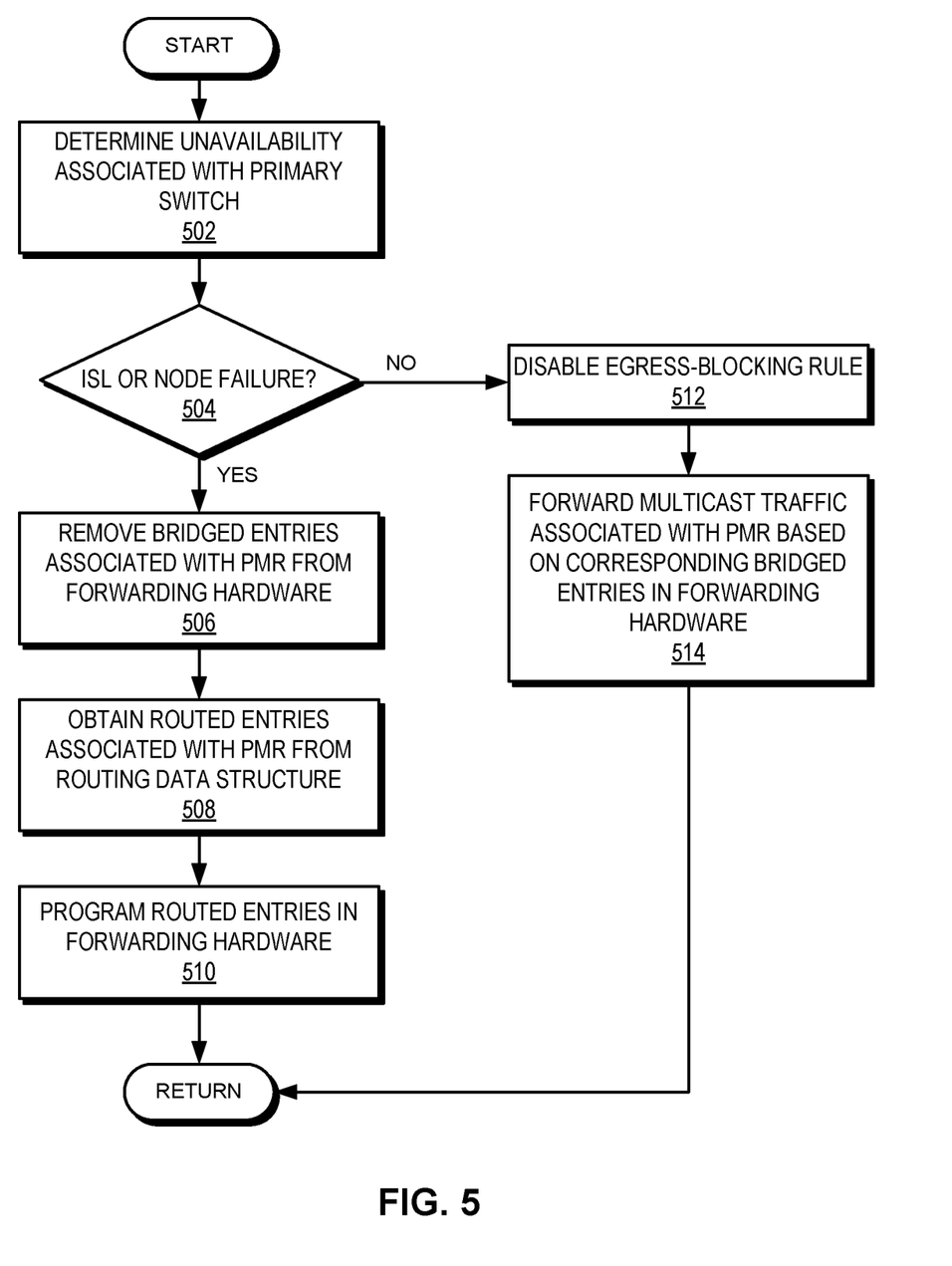
FIG. 5 presents a flowchart illustrating the process of a secondary switch in a VGS providing high availability, in accordance with an aspect of the present application.

FIG. 5 presents a flowchart illustrating the process of a secondary switch in a VGS providing high availability, in accordance with an aspect of the present application. During operation, the switch can determine the unavailability associated with the primary switch of the VGS (operation 502). The switch can determine whether the unavailability is due to the ISL or node failure (operation 504). If the unavailability is not due to the ISL or node failure, the unavailability can be due to an external link failure. The switch can then disable the egress-blocking rule (operation 512) and forward the multicast traffic associated with the PMR based on the corresponding bridged entries in the forwarding hardware (operation 512).

On the other hand, if the unavailability is due to the ISL or node failure, the switch can remove the bridged entries associated with the PMR from the forwarding hardware (operation 506). The switch can also obtain routed entries associated with the PMR from the routing data structure (operation 508) and program the routed entries in the forwarding hardware (operation 510). In this way, the switch can ensure that the traffic received from an upstream MC-LAG can be forwarded to a downstream switch.

Figure 6:
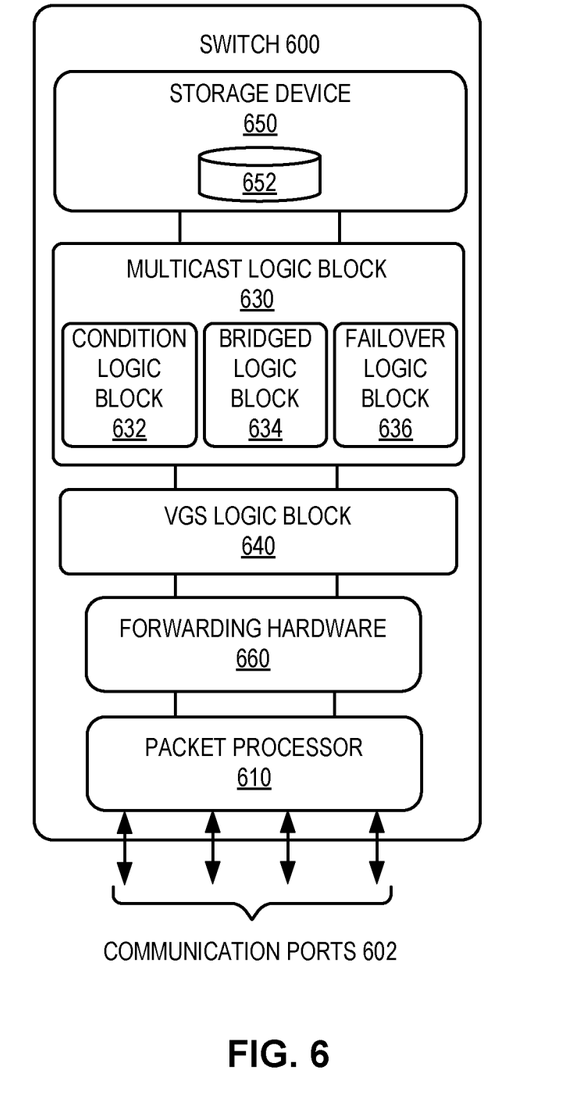
FIG. 6 illustrates an example of a switch supporting efficient installation of programmable multicast routes in forwarding hardware, in accordance with an aspect of the present application.

FIG. 6 illustrates an example of a switch supporting efficient installation of programmable multicast routes in forwarding hardware, in accordance with an aspect of the present application. In this example, a switch 600 can include a number of communication ports 602, a packet processor 610, and a storage device 650. Switch 600 can also include forwarding hardware 660 (e.g., processing hardware of switch 600, such as its application-specific integrated circuit (ASIC) chips), which includes information based on which switch 600 processes packets (e.g., determines output ports for packets). Packet processor 610 can extract and processes header information from the received packets. Packet processor 610 can identify a switch identifier (e.g., a MAC address and/or an IP address) associated with switch 600 in the header of a packet.

Communication ports 602 can include inter-switch communication channels for communication with other switches and/or user devices. The communication channels can be implemented via a regular communication port and based on any open or proprietary format. Communication ports 602 can include one or more Ethernet ports capable of receiving frames encapsulated in an Ethernet header. Communication ports 602 can also include one or more IP ports capable of receiving IP packets. An IP port is capable of receiving an IP packet and can be configured with an IP address. Packet processor 610 can process Ethernet frames and/or IP packets. A respective port of communication ports 602 may operate as an ingress port and/or an egress port.

Switch 600 can maintain a database 652 (e.g., in storage device 650). Database 652 can be a relational database and may run on one or more Database Management System (DBMS) instances. Database 652 can store information associated with the routing, configuration, and interfaces of switch 600. Database 652 may store the routing data structure. Switch 600 can include a VGS logic block 640. VGS logic block 640 can allow switch 600 to operate as a VGS, such as VGS 106, in a tunnel fabric. To do so, VGS logic block 640 may operate in conjunction with another switch. Switch 600 can include a multicast logic block 630 that can allow switch 600 to efficiently install PMRs in forwarding hardware 660.

Multicast logic block 630 can include a condition logic block 632, a bridged logic block 634, and a failover logic block 636. If a PMR is configured for switch 600, multicast logic block 630 can generate an entry representing the PMR in the routing data structure. Condition logic block 632 can determine whether a set of conversion conditions is met (i.e., whether switch 600 is a candidate switch for conversion) for the PMR. If the conversion conditions are met, bridged logic block 634 can generate a set of bridged entries based on the PMR.

Upon detecting unavailability associated with the VGS, failover logic block 636 can facilitate high availability. If the unavailability is caused by a failure of an external link, failover logic block 636 can disable the egress-blocking rule. On the other hand, if the unavailability is caused by a failure at another participant switch or in an ISL, failover logic block 636 can remove the bridged entries and program corresponding routed entries in forwarding hardware 660.

The description herein is presented to enable any person skilled in the art to make and use the invention, and is provided in the context of a particular application and its requirements. Various modifications to the disclosed examples will be readily apparent to those skilled in the art, and the general principles defined herein may be applied to other examples and applications without departing from the spirit and scope of the present invention. Thus, the present invention is not limited to the examples shown, but is to be accorded the widest scope consistent with the claims.

One aspect of the present technology can provide a first switch in a network. During operation, the first switch can receive traffic associated with a virtual network address allocated to the first switch and a second switch. The first switch can operate in conjunction with the second switch to provide high availability to each other in the network. If a layer-3 static multicast route is received at the first switch for a multicast group, the first switch can configure the static multicast route in the control plane of the first switch. The first switch can determine that a set of conversion conditions are satisfied for the static multicast route at the first switch. The set of conversion conditions can be applicable to a respective switch associated with the virtual network address. If the set of conversion conditions is satisfied, the first switch can generate a set of layer-2 entries for the multicast group from the static multicast route and program the forwarding hardware of the first switch to include the set of layer-2 entries.

In a variation on this aspect, the set of conversion conditions being satisfied at the first switch indicates that the set of conversion conditions are not satisfied at the second switch. The static multicast route can then be programmed in the forwarding hardware of the second switch.

In a variation on this aspect, the set of conversion conditions indicate whether the first switch is a secondary switch associated with the virtual network address and whether respective virtual and physical topologies associated with the first and second switches are symmetric.

In a further variation, the virtual topology being symmetric can indicate the same set of virtual local area networks (VLANs) being configured at the first and second switches. Moreover, the physical topology being symmetric can indicate the same set of devices being coupled to the first and second switches.

In a variation on this aspect, the first switch can receive a multicast packet of the multicast group via an inter-switch link (ISL) coupling the first and second switches. The first switch can then apply an egress-blocking rule for the ISL on the set of layer-2 entries. Here, the egress-blocking rule prevents the first switch from forwarding a respective multicast packet received via the ISL to a downstream device.

In a further variation, the second switch can be the primary switch associated with the virtual network address. Upon determining the unavailability of an external link coupling the second switch, the first switch can disable the egress-blocking rule for the set of layer-2 entries.

In a variation on this aspect, the second switch can be the primary switch associated with the virtual network address. Upon determining the unavailability of a node or a link associated with the virtual network address, the first switch can program, in the forwarding hardware of the first switch, the static multicast route from the control plane and remove the set of layer-2 entries from the forwarding hardware of the first switch.

In a variation on this aspect, a source of the multicast group can be coupled to the first switch a multi-chassis link-aggregation group (MC-LAG) or a local interface of the first switch.

In a variation on this aspect, a respective entry of the set of layer-2 entries corresponds to a VLAN configured at the first and second switches.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The methods and processes described herein can be executed by and/or included in hardware logic blocks or apparatus. These logic blocks or apparatus may include, but are not limited to, an application-specific integrated circuit (ASIC) chip, a field-programmable gate array (FPGA), a dedicated or shared processor that executes a particular software logic block or a piece of code at a particular time, and/or other programmable-logic devices now known or later developed. When the hardware logic blocks or apparatus are activated, they perform the methods and processes included within them.

The foregoing descriptions of examples of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method comprising:

receiving, by a first switch in a network, traffic associated with a virtual network address allocated to the first switch and a second switch, wherein the first switch operates in conjunction with the second switch to provide high availability to each other in the network, and wherein the second switch is a primary switch associated with the virtual network address; and in response to receiving, at the first switch, a layer-3 static multicast route indicating a multicast group address of a multicast group:

storing the static multicast route in a data structure of a control plane of the first switch;

determining whether a set of conversion conditions is satisfied for the static multicast route at the first switch, wherein the set of conversion conditions corresponds to a respective switch associated with the virtual network address;

in response to the set of conversion conditions being satisfied for the static multicast route at the first switch:

generating, by the first switch, a set of layer-2 entries for the multicast group based on the static multicast route; and programming the set of layer-2 entries into forwarding hardware of the first switch; and in response to determining unavailability associated with the virtual network address:

programming, in the forwarding hardware of the first switch, the static multicast route from the data structure; and removing the set of layer-2 entries from the forwarding hardware of the first switch.

2. The method of claim 1, wherein the set of conversion conditions being satisfied at the first switch indicates that the set of conversion conditions are not satisfied at the second switch, and wherein the static multicast route is programmed in forwarding hardware of the second switch.

3. The method of claim 1, wherein the set of conversion conditions indicates whether:

the first switch is a secondary switch associated with the virtual network address; and respective virtual and physical topologies associated with the first and second switches are symmetric.

4. The method of claim 3, wherein the virtual topology being symmetric indicates a same set of virtual local area networks (VLANs) being configured at the first and second switches; and wherein the physical topology being symmetric indicates a same set of devices being coupled to the first and second switches.

5. The method of claim 1, further comprising:

receiving a multicast packet of the multicast group via an inter-switch link (ISL) coupled to the first and second switches; and applying an egress-blocking rule for the ISL on the set of layer-2 entries, wherein applying the egress-blocking rule prevents forwarding of the multicast packet based on the set of layer-2 entries.

6. The method of claim 5, wherein the method further comprises:

determining unavailability of an external link coupled to the second switch; and disabling the egress-blocking rule for the set of layer-2 entries.

7. The method of claim 1, wherein a source of the multicast group is coupled to the first switch via a multi-chassis link-aggregation group (MC-LAG) or a local interface of the first switch.

8. The method of claim 1, wherein a respective entry of the set of layer-2 entries corresponds to a distinct VLAN configured on the first and second switches.

9. A non-transitory computer-readable storage medium storing instructions that when executed by a processor of a first switch in a network cause the processor to perform a method, the method comprising:

receiving traffic associated with a virtual network address allocated to the first switch and a second switch, wherein the first switch operates in conjunction with the second switch to provide high availability to each other in the network, and wherein the second switch is a primary switch associated with the virtual network address; and in response to receiving, at the first switch, a layer-3 static multicast route indicating a multicast group address of a multicast group:

storing the static multicast route in a data structure of a control plane of the first switch; and determining whether a set of conversion conditions is satisfied for the static multicast route at the first switch, wherein the set of conversion conditions corresponds to a respective switch associated with the virtual network address;

in response to the set of conversion conditions being satisfied for the static multicast route at the first switch:

generating a set of layer-2 entries for the multicast group based on the static multicast route; and programming the set of layer-2 entries into forwarding hardware of the first switch; and in response to determining unavailability associated with the virtual network address:

programming the static multicast route from the data structure into the forwarding hardware; and removing the set of layer-2 entries from the forwarding hardware of the first switch.

10. The non-transitory computer-readable storage medium of claim 9, wherein the set of conversion conditions being satisfied at the first switch indicates that the set of conversion conditions are not satisfied at the second switch, and wherein the static multicast route is programmed in forwarding hardware of the second switch.

11. The non-transitory computer-readable storage medium of claim 9, wherein the set of conversion conditions indicates whether:

the first switch is a secondary switch associated with the virtual network address; and respective virtual and physical topologies associated with the first and second switches are symmetric.

12. The non-transitory computer-readable storage medium of claim 11, wherein the virtual topology being symmetric indicates a same set of virtual local area networks (VLANs) being configured at the first and second switches; and wherein the physical topology being symmetric indicates a same set of devices being coupled to the first and second switches.

13. The non-transitory computer-readable storage medium of claim 9, wherein the method further comprises:

receiving a multicast packet of the multicast group via an inter-switch link (ISL) coupled to the first and second switches; and applying an egress-blocking rule for the ISL on the set of layer-2 entries, wherein applying the egress-blocking rule prevents forwarding of the multicast packet based on the set of layer-2 entries.

14. The non-transitory computer-readable storage medium of claim 13, wherein the second switch is a primary switch associated with the virtual network address; and
wherein the method further comprises:
determining unavailability of an external link coupled to the second switch; and
disabling the egress-blocking rule for the set of layer-2 entries.

15. The non-transitory computer-readable storage medium of claim 9, wherein a source of the multicast group is coupled to the first switch via a multi-chassis link-aggregation group (MC-LAG) or a local interface of the first switch.

16. A computer system, comprising:
a processor;
forwarding hardware;
a communication port to receive traffic associated with a virtual network address allocated to the computer system and a second computer system, wherein the computer system operates in conjunction with the second computer system to provide high availability to each other in a network, and wherein the second computer system is a primary device associated with the virtual network address;
a non-transitory computer-readable storage medium storing instructions that when executed by the processor cause the computer system to:
in response to receiving a layer-3 static multicast route indicating a multicast group address of a multicast group, store the static multicast route in a data structure of a control plane of the computer system;
determine whether a set of conversion conditions is satisfied for the static multicast route at the computer system, wherein the set of conversion conditions corresponds to a respective device associated with the virtual network address;

in response to the set of conversion conditions being satisfied for the static multicast route at the computer system:
generate a set of layer-2 entries for the multicast group based on the static multicast route; and
program the set of layer-2 entries into the forwarding hardware; and
in response to determining unavailability associated with the virtual network address:
program, in the forwarding hardware, the static multicast route from the data structure; and
remove the set of layer-2 entries from the forwarding hardware.

17. The computer system of claim 16,
wherein the instructions when executed by the processor cause the computer system to:
determine unavailability of an external link coupling the second computer system;
disable an egress-blocking rule for the set of layer-2 entries, wherein the egress-blocking rule prevents the forwarding hardware from forwarding a respective multicast packet received from the second computer system to a downstream device.

18. The computer system of claim 16, wherein the set of conversion conditions being satisfied at the computer system indicates that the set of conversion conditions are not satisfied at the second computer system, and wherein the static multicast route is programmed in forwarding hardware of the second computer system.

19. The computer system of claim 16, wherein the set of conversion conditions indicates whether:
the computer system is a secondary device associated with the virtual network address; and
respective virtual and physical topologies associated with the first and second computer systems are symmetric.

20. The computer system of claim 19, wherein the virtual topology being symmetric indicates a same set of virtual local area networks (VLANs) being configured at the computer system and the second computer system; and
wherein the physical topology being symmetric indicates a same set of devices being coupled to the computer system and the second computer system.

* * * * *